(12) United States Patent
Andersen et al.

(10) Patent No.: US 9,000,970 B2
(45) Date of Patent: Apr. 7, 2015

(54) ARRANGEMENT TO MEASURE THE DEFLECTION OF AN OBJECT

(75) Inventors: Jimmi Andersen, Holstebro (DK); Per Egedal, Herning (DK); Henrik Stiesdal, Odense C (DK); Andreas Ziroff, Passau (DE)

(73) Assignee: Siemens Aktiengesellschaft, München (DE)

( * ) Notice: Subject to any disclaimer, the term of this patent is extended or adjusted under 35 U.S.C. 154(b) by 565 days.

(21) Appl. No.: 13/362,042

(22) Filed: Jan. 31, 2012

(65) Prior Publication Data

US 2012/0200444 A1 Aug. 9, 2012

(30) Foreign Application Priority Data

Feb. 7, 2011 (EP) .................................... 11153559

(51) Int. Cl.
*H01Q 15/00* (2006.01)
*G01B 15/06* (2006.01)
*G01S 3/48* (2006.01)
*G01S 13/42* (2006.01)
*G01S 13/88* (2006.01)
*G01S 13/75* (2006.01)

(52) U.S. Cl.
CPC ................. *G01B 15/06* (2013.01); *G01S 13/88* (2013.01); *G01S 3/48* (2013.01); *G01S 13/42* (2013.01); *G01S 13/75* (2013.01)

(58) Field of Classification Search
CPC ........... G01S 13/88; G01S 3/48; G01S 13/42; G01S 13/75; G01B 15/06
USPC ................................................ 342/6; 290/44
See application file for complete search history.

(56) References Cited

U.S. PATENT DOCUMENTS

| 3,515,485 | A | * | 6/1970 | Frank | 356/141.2 |
| 4,305,074 | A | | 12/1981 | Barzana | |
| 6,208,283 | B1 | * | 3/2001 | Murata et al. | 342/25 R |
| 2004/0057828 | A1 | * | 3/2004 | Bosche | 416/1 |
| 2010/0021298 | A1 | | 1/2010 | Sandvad | |
| 2010/0084864 | A1 | * | 4/2010 | Lucks | 290/44 |
| 2010/0253569 | A1 | | 10/2010 | Stiesdal | |
| 2012/0154202 | A1 | * | 6/2012 | Go et al. | 342/118 |

FOREIGN PATENT DOCUMENTS

| DE | 102006054667 A1 | 5/2008 |
| EP | 2239462 A1 | 10/2010 |
| WO | WO 2008119354 A2 | 10/2008 |

OTHER PUBLICATIONS

Web site, "Radar Basics—Phased Array Antenna", Jan. 23, 2009 version, https://web.archive.org/web/20090123011852/http://radartutorial.eu/06.antennas/an14.en.html.*

(Continued)

*Primary Examiner* — Frank J McGue

(57) ABSTRACT

A reflector is arranged at a first position, which is assigned to a first end of the object. An antenna-system is arranged at a second position, which is assigned to a second end of the object. The antenna system contains a transmit antenna and a receive antenna, while the reflector and the antenna-system are coupled by a radio signal. The radio signal is sent from the transmit antenna via the reflector towards the receive antenna. The receive antenna is connected with an evaluation unit, which is prepared to measure the deflection between the first end of the object and the second end of the object based on the received radio signal.

11 Claims, 2 Drawing Sheets

(56) References Cited

OTHER PUBLICATIONS

Web site, "Radiation Pattern", Dec. 2, 2008 version, https://web.archive.org/web/20081202042802/http://www.antenna-theory.com/basics/radPattern.html.*

J.J. Carr, "Joe Carr's Radio Tech-NOtes, Directional or Omnidirectional Antenna?", Feb. 1, 2001, http://146970.com/PDFs/Antenna%20-%20Directional%20or%20Omnidirectional%20Antenna.pdf.*

* cited by examiner

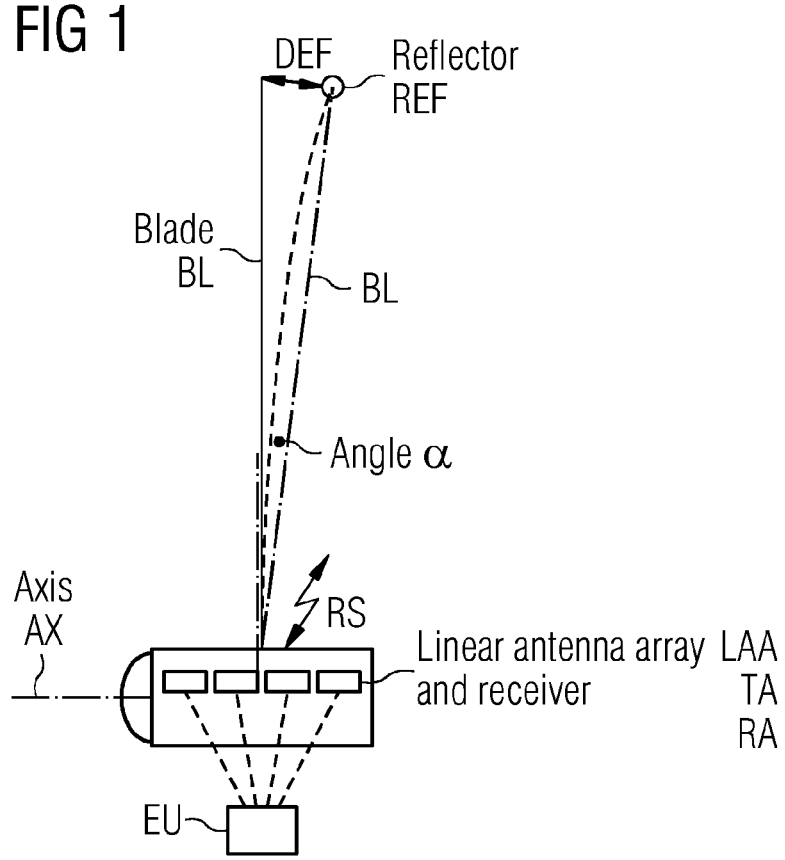
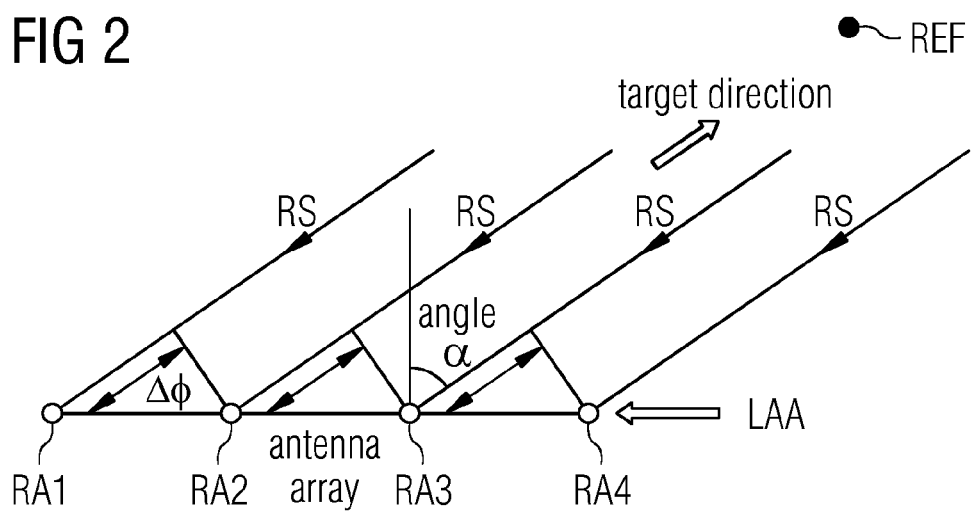

ARRANGEMENT TO MEASURE THE DEFLECTION OF AN OBJECT

CROSS REFERENCE TO RELATED APPLICATIONS

This application claims priority of European Patent Office application No. 11153559.7 EP filed Feb. 7, 2011. All of the applications are incorporated by reference herein in their entirety.

FIELD OF INVENTION

The invention relates to an arrangement to measure the deflection or bending of an object, preferably to measure the deflection or bending of a wind-turbine blade.

BACKGROUND OF INVENTION

Blades of modern wind turbines are quite long—they are up to 45 meters long or even more. Thus their shape and their characteristics need to be optimized, especially to prevent that turning blades hit the tower while the wind turbine is in operation.

Especially the deflection or bending of the blade near its tip-end needs to be known to prevent those damages.

It is known to attach strain gauges on the blade-surface. They are mainly used for test purposes to gather a certain knowledge about the blade when it is stressed.

The installation of gauges and the installation of their electrical cabling needed is expensive, especially asides a wind turbine which is in operation. The equipment (especially the cabling) is exposed to lightning strikes, thus the gauges are mainly used for time-limited test purposes.

It is known to use distance-measurement-systems to measure blade-deflections. Parts of the system (like a reflector for wireless transmitted optical signals) are arranged inside a cavity of the blade, while other parts of the system (like an optical transmitter and/or optical receiver) are arranged inside the hub of the wind turbine.

Only a certain blade-deflection can be measured by theses systems due to the location of the system-parts. The deflection of the tip-end of the blade can only be approximated as the cavity is not elongated towards the tip-end of the blade.

SUMMARY OF INVENTION

It is therefore the aim of the invention to provide an improved arrangement and method to measure the deflection or bending of an extended object, especially for a wind-turbine-blade.

This aim is reached by the features the independent claims. Further embodiments of the invention are object of the dependent claims.

According to the invention an arrangement is provided to measure the deflection of an object. A reflector is arranged at a first position, which is assigned to a first end of the object. An antenna-system is arranged at a second position, which is assigned to a second end of the object. The antenna system contains a transmit antenna and a receive antenna, while the reflector and the antenna-system are coupled by a radio signal. The radio signal is sent from the transmit antenna via the reflector towards the receive antenna. The receive antenna is connected with an evaluation unit, which is prepared to measure the deflection between the first end of the object and the second end of the object based on the received radio signal.

Due to this arrangement there is no need for an additional cabling inside the blade. Thus there is a less probability that lightning strikes harm the components used.

The blade-deflection can be measured while the wind turbine is in operational mode. All relevant components are a well integrated part of the wind turbine, thus the arrangement is "long-time fully functional".

Preferably the antenna system is part of an active radar system. The radar system contains a radar transmitter and a radar receiver, being used to send and receive a radar signal as radio signal. The radar transmitter is connected with the transmit antenna, while the radar receiver is connected with the receive antenna.

Due to the radar signals used the whole system is very reliable even in bad weather conditions.

Furthermore the whole system provides a high accuracy and sampling rate and does not require any kind of image processing in view to the prior art.

In an embodiment the passive reflector is arranged at the tip-end of a wind turbine blade, while the tip-end is the first end of the object. Thus the tip end defines the first position.

If a passive reflector is arranged in the tip end of the blade no lightning protection issues will be created additionally.

In an embodiment the blade is connected via its root-end, which is the second end of the object, with a hub. The antenna system is arranged at the root end of the blade, thus the root end of the blade defines the second position.

The antenna system may be even arranged asides the hub of the wind turbine, thus the hub defines the second position.

In an embodiment the blade is connected via its root-end, which is the second end of the object, with the hub of the wind turbine while the hub is connected with a nacelle of the wind turbine. Thus the blade and the hub rotate around a longitudinal axis of the nacelle. The antenna system is arranged at the nacelle, thus the nacelle defines the second position.

In an embodiment the receive antenna contains a number of single antennas, which might be arranged as a linear antenna array.

This allows that each single antenna receives the radio signal with a certain phase-difference, which is assigned to the position of the certain single antenna. The evaluation unit is arranged and prepared to measure these phase-differences and to calculate the deflection based on the phase-differences.

In an embodiment the reflector and the antenna-system are coupled by a number of radio signals. Thus the measurement is enhanced and the results are more exact.

In an embodiment each blade of the wind turbine contains a passive reflector. Thus the measurement is done at the wind turbine, which is in operation, and the results are more exact in view to each blade.

In an embodiment the receive antenna is a directional antenna to maximize the signal strength of the radio signal via its antenna-gain.

In an embodiment the transmit antenna might be a directional antenna to maximize the signal strength of the radio signal via its antenna-gain.

In an embodiment the reflector might be prepared and shaped to amplify the radio signal.

In an embodiment the reflector is a corner-reflector or a semi-passive reflector.

The semi-passive reflector may be operated at low power by help of a battery. The semi-passive reflector may be even used to modulate the reflected radio signal. Thus the signal sensitivity is improved. Even interfering reflections of the radio signal, caused by the environment, are reduced.

In an embodiment the reflector is prepared to modulate the reflected radio signal. Thus the results are more exact.

BRIEF DESCRIPTION OF THE DRAWINGS

The invention is shown in more detail by help of figures. The figures show preferred configurations and do not limit the scope of the invention.

FIG. 1 shows one preferred arrangement according to the invention,

FIG. 2 shows measured phase differences in view to the arrangement of FIG. 1,

DETAILED DESCRIPTION OF INVENTION

FIG. 1 shows one preferred arrangement according to the invention.

The deflection DEF or bending of a wind turbine blade BL needs to be measured.

A reflector REF is arranged asides a first end of the blade BL.

An antenna-system LAA contains at least one transmit antenna TA and—as a plurality of receive antennas RA, for example four receive antennas RA as illustrated.

The antenna system LAA is arranged asides the nacelle of the wind turbine and close to the second end of the blade BL.

The antenna system LAA is part of an active radar system.

The four receive antennas RA are arranged as "linear antenna array".

The reflector REF and the antenna-system LAA are coupled by a radio signal RS, which is sent from the transmit antenna TA via the reflector REF towards the receive antennas RA.

The receive antennas RA are connected with an evaluation unit EU, which is prepared to measure the deflection DEF between the first end of the blade BL and the second end of the blade BL based on the received radio signal RS.

The blade BL rotates around a longitudinal axis AX of the nacelle and is bended or deflected due to the wind load for example.

The deflection DEF of the blade BL is measured while the wind turbine is in operation/is at work. The blade BL is "turned out of the wind" if the deflection exceeds a certain limit. This action might be done by help the pitch-system of the blade BL or by help of the yawing-system of the nacelle if needed (not shown here in detail).

FIG. 2 shows measured phase differences ΔØ in view to the arrangement of FIG. 1.

Four receive antennas RA1, RA2, RA3 and RA4 are arranged in a line as linear antenna array.

The radio signal RS is reflected by the reflector REF, thus the reflected radio signal RS is received by the four receive antennas RA1 up to RA4.

Each of the single antennas RA1 to RA4 receive the radio signal RS with a certain phase-difference ΔØ, while the phase difference ΔØ is assigned to the position of the certain single antenna RA1 to RA4.

The evaluation unit EU as shown in FIG. 1 is arranged and prepared to measure these phase-differences ΔØ and to calculate the deflection DEF based on the phase-differences ΔØ.

The phase-differences ΔØ can be also written as angle α which is a certain value of the deflection DEF of the blade BL.

The certain phase-difference ΔØ is close related to the deflection DEF of the blade BL. The value of the phase-difference ΔØ increases if the deflection DEF increases.

With the help of the angle α it is possible to calculate the deflection DEF of the blade BL.

Figure 3:
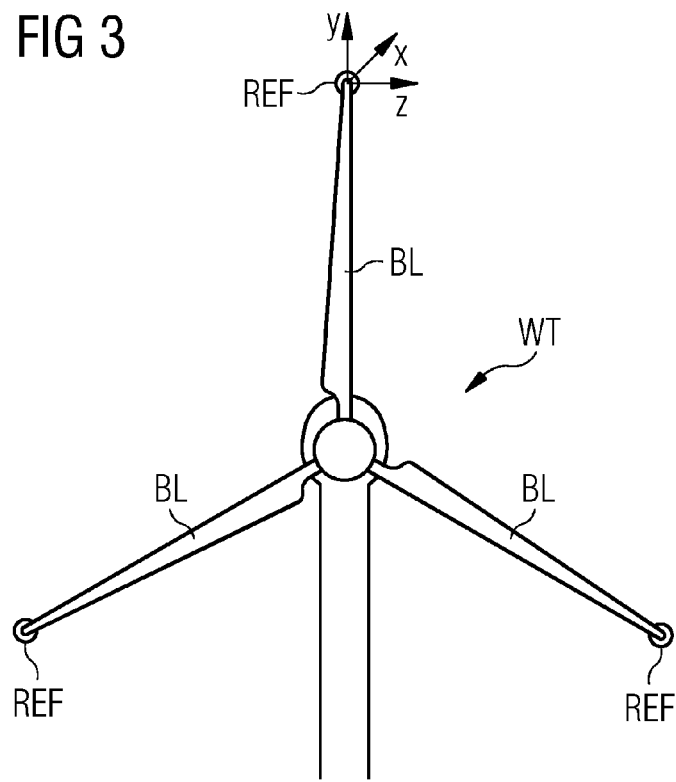
FIG. 3 shows an improved arrangement in view to FIG. 1.

FIG. 3 shows an improved arrangement in view to the figures FIG. 1 and FIG. 2.

Each blade BL of the wind turbine WT is equipped with a dedicated reflector REF.

Figure 4:
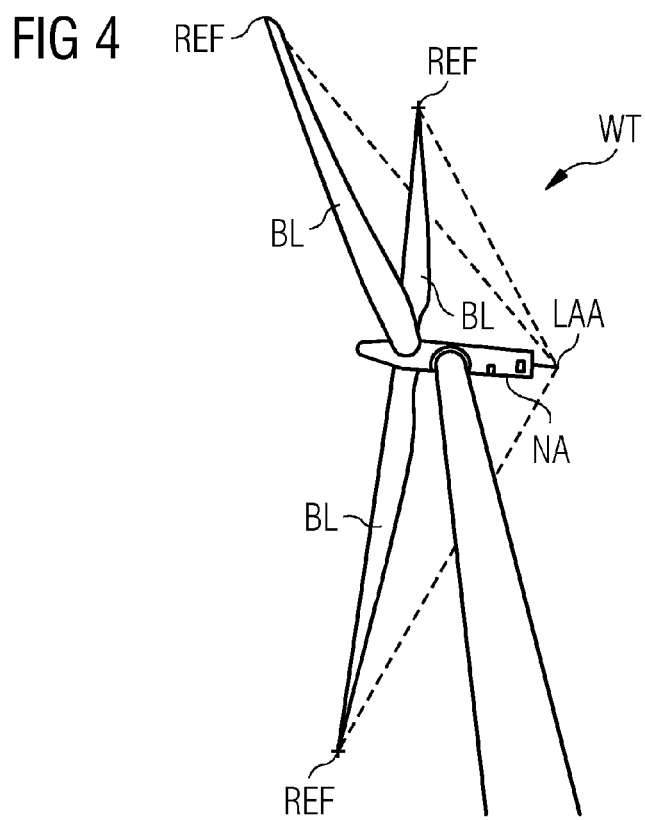
FIG. 4 shows an improved arrangement in view to FIG. 3.

FIG. 4 shows an improved arrangement in view to FIG. 3.

The antenna system LAA is arranged with the other parts of the active radar system behind the rotor and is connected with the nacelle NA of the wind turbine WT.

It would be understood that the features shown in the figures are not

While the invention has been described in terms of a certain embodiments and suggested possible modifications thereto, other embodiments and modifications apparent to those of ordinary skill in the art are also within the scope of this invention without departure from the spirit and scope of this invention. Thus, the scope of the invention should be determined based upon the appended claims and their legal equivalents, rather than the specific embodiments described above.

The invention claimed is:

1. An arrangement to measure the deflection a blade of a wind turbine, comprising:
    the blade is connected via a root-end with a hub of the wind turbine and the hub is connected with a nacelle of the wind turbine, the blade and the hub rotate around a longitudinal axis of the nacelle;
    a passive reflector arranged at a tip of the blade; and
    an antenna system is arranged at a nacelle of the wind turbine and near the root-end of the blade,
    wherein the antenna system contains a transmit antenna and a plurality of receive antennas,
    wherein the plurality of receive antennas are arranged as a linear antenna array,
    wherein the passive reflector and the antenna-system are coupled by a radio signal, which is sent from the transmit antenna via the passive reflector towards the plurality of receive antennas,
    the plurality of receive antennas are arranged in a way that each of the plurality of receive antennas receive the radio signal with a phase-difference, which is assigned to the position of the respective antenna, and
    wherein the plurality of receive antennas is connected with an evaluation unit, which is configured to measure the phase differences and to calculate the deflection of the blade based on the phase-differences.

2. The arrangement according to claim 1,
    wherein the passive reflector and the antenna-system are coupled by a plurality of radio signals.

3. The arrangement according to claim 1,
    wherein each blade of the wind turbine contains a passive reflector.

4. The arrangement according to claim 3,
    wherein the reflector is a corner-reflector or
    wherein the reflector is a semi-passive reflector, which is powered by an energy source to achieve a certain gain of the reflector, and/or
    wherein the reflector is prepared to modulate the reflected radio signal.

5. The arrangement according to claim 1,
    wherein the receive antenna is a directional antenna in order to maximize the signal strength of the radio signal via an antenna-gain of the receive antenna.

6. The arrangement according to claim 5,
    wherein the transmit antenna is a directional antenna to maximize the signal strength of the radio signal via an antenna-gain of the transmit antenna.

7. The arrangement according to claim 6,
wherein the passive reflector is prepared and shaped to amplify the radio signal.
8. The arrangement according to claim 5,
wherein the reflector is prepared and shaped to amplify the radio signal.
9. The arrangement according to claim 1,
wherein the transmit antenna is a directional antenna to maximize the signal strength of the radio signal via an antenna-gain of the transmit antenna.
10. The arrangement according to claim 1,
wherein the passive reflector is prepared and shaped to amplify the radio signal.
11. The arrangement according to claim 1,
wherein the reflector is prepared and shaped to amplify the radio signal.

\* \* \* \* \*